United States Patent
Lundberg

(10) Patent No.: US 11,062,542 B2
(45) Date of Patent: Jul. 13, 2021

(54) DETERMINING WHETHER A USER WITH A CREDENTIAL SHOULD BE GRANTED ACCESS TO A PHYSICAL SPACE

(71) Applicant: ASSA ABLOY AB, Stockholm (SE)

(72) Inventor: Frans Lundberg, Saltsjobaden (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/566,160

(22) PCT Filed: Apr. 18, 2016

(86) PCT No.: PCT/EP2016/058491
§ 371 (c)(1),
(2) Date: Oct. 12, 2017

(87) PCT Pub. No.: WO2016/166362
PCT Pub. Date: Oct. 20, 2016

(65) Prior Publication Data
US 2018/0089915 A1    Mar. 29, 2018

(30) Foreign Application Priority Data
Apr. 16, 2015  (EP) .................. 15163852

(51) Int. Cl.
*G07C 9/00* (2020.01)
*G07C 9/27* (2020.01)
(Continued)

(52) U.S. Cl.
CPC ........... *G07C 9/00904* (2013.01); *G07C 9/22* (2020.01); *G07C 9/27* (2020.01); *H04L 63/102* (2013.01);
(Continued)

(58) Field of Classification Search
CPC ............ G07C 9/00103; G07C 9/00031; G07C 9/00904; H04W 12/08; H04L 63/102; G06F 21/604
(Continued)

(56) References Cited

U.S. PATENT DOCUMENTS 7,650,633 B2 * 1/2010 Whitson .............. G06F 21/604
                                                              726/6
2009/0089291 A1 * 4/2009 Daily .................... G06Q 10/10
(Continued)

FOREIGN PATENT DOCUMENTS

| CN | 1763761 | 4/2006 |
| EP | 2098998 | 9/2009 |
| GB | 2331547 | 5/1999 |

OTHER PUBLICATIONS

"Database," Wikipedia, the free encyclopedia, 2009, retrieved from http://en.wikipedia.org/wiki/Database, 7 pages.
(Continued)

*Primary Examiner* — Quan-Zhen Wang
*Assistant Examiner* — Mancil Littlejohn, Jr.
(74) *Attorney, Agent, or Firm* — Sheridan Ross P.C.

(57) ABSTRACT

It is presented a method for determining whether a user with a credential should be granted access to a physical space. The method is performed in an access control device and comprising the steps of: identifying the credential presented to the access control device; obtaining a set of at least one assignment of a permission, associated with the physical space, to external organisations from a database; determining a credential organisation being associated with the credential; and granting access when, and only when, the permission is assigned to the credential organisation.

19 Claims, 5 Drawing Sheets

(51) Int. Cl.
  *G07C 9/22* (2020.01)
  *H04W 12/084* (2021.01)
  *H04L 29/06* (2006.01)
  *G06F 21/60* (2013.01)
  *H04W 12/08* (2021.01)

(52) U.S. Cl.
  CPC ......... *H04W 12/084* (2021.01); *G06F 21/604* (2013.01)

(58) Field of Classification Search
  USPC .......................................................... 340/5.2
  See application file for complete search history.

(56) References Cited

U.S. PATENT DOCUMENTS

| | | | | |
|---|---|---|---|---|
| 2009/0313079 | A1* | 12/2009 | Wahl | G06Q 10/06 705/7.23 |
| 2011/0187493 | A1 | 8/2011 | Elfstrom et al. | |
| 2012/0180123 | A1* | 7/2012 | Kuenzi | H04L 63/083 726/20 |
| 2014/0247111 | A1* | 9/2014 | Elfstrom | G07C 9/22 340/5.61 |

OTHER PUBLICATIONS

International Search Report and Written Opinion prepared by the European Patent Office dated Jun. 20, 2016, for International Application No. PCT/EP2016/058491.
Second Written Opinion prepared by the European Patent Office dated Mar. 15, 2017, for International Application No. PCT/EP2016/058491.
International Preliminary Report on Patentability prepared by the European Patent Office dated Jul. 7, 2017, for International Application No. PCT/EP2016/058491.
Official Action with English Translation for China Patent Application No. 201680021537.3, dated Jul. 16, 2019, 22 pages.
Abdallah et al. "Integrating Delegation with the Formal Core RBAC Model," IEEE, The Fourth International Conference on Information Assurance and Security, 2008, 4 pages.
Barka et al. "Role-Based Delegation Model/Hierarchical Roles (RBDM1)," IEEE, Proceedings of the 20th Annual Computer Security Applications Conference (ACSAC'04), 2004, 9 pages.
Official Action with English Translation for China Patent Application No. 201680021537.3, dated Jan. 22, 2020, 23 pages.
Official Action for European Patent Application No. 16717138.8, dated Dec. 4, 2019, 8 pages.
Official Action with English Translation for China Patent Application No. 201680021537.3, dated Aug. 5, 2020, 11 pages.

* cited by examiner

DETERMINING WHETHER A USER WITH A CREDENTIAL SHOULD BE GRANTED ACCESS TO A PHYSICAL SPACE

CROSS REFERENCE TO RELATED APPLICATIONS

This application is a national stage application under 35 U.S.C. 371 and claims the benefit of PCT Application No. PCT/EP2016/058491 having an international filing date of 18 Apr. 2016, which designated the United States, which PCT application claimed the benefit of European Patent Application No. 15163852.5 filed 16 Apr. 2015, the disclosure of each of which are incorporated herein by reference.

TECHNICAL FIELD

The invention relates to a method, an access control device, a computer program and a computer program product for determining whether a user with a credential should be granted access to a physical space.

BACKGROUND

Site owners control and manage sites, e.g. in the form of buildings. The site owners need to allow access to other organisations, such as tenants, to the sites, or one or more restricted areas of the sites. One way to do this is to allow the organisations to set up their own access control system to the restricted area they are renting. However, there may be restricted areas which are shared between tenants, where tenants, but no other parties, should be granted access.

US 20110187493 discloses methods, systems, and devices for controlling access within a multi-facility room. More specifically, a guest of the multi-room facility is allowed to remotely confirm reservations to the facility as well as bypass the front desk of the multi-room for check-in purposes. At a location within the facility, the guest is allowed to confirm their arrival, check-in, and have their access credential written with personalized access data that may be useable for the duration of the guests' stay.

However, the presented solution is not flexible enough for site owners to conveniently manage both separate access and shared access between organisations.

SUMMARY

One object of the present invention is to allow a site owner to let multiple organisations conveniently and securely share access to the site owned by the site owner without the need for a central control function that is common to all of the organisations.

According to a first aspect, it is presented a method for determining whether a user with a credential should be granted access to a physical space. The method is performed in an access control device and comprising the steps of: identifying the credential presented to the access control device; obtaining (50) a set of at least one assignment of a permission (P), associated with the physical space, to external organisations (O) from a database; determining (52) a credential organisation being associated with the credential (C); and granting access when, and only when, the permission is assigned to the credential organisation. The external organisation differs from the site owner, controlling the access control device.

The method may further comprise the step of: obtaining a set of site roles associated with the credential identity. In such a case, the step of granting access further comprising granting access when and only when there is at least one site role in the set of site roles to which a permission is assigned.

The step of obtaining a set of site roles may comprise the steps of: obtaining a user identity assigned to the credential; and obtaining a set of site roles assigned to the user identity.

The step of granting access may further comprise granting access when and only when all available validity times of one or more of the assignments indicate validity.

The step of obtaining a user identity assigned to the credential may comprise reading data from a memory of the access control device, which caches data from a server of the credential organisation.

The step of obtaining a set of site roles assigned to the user identity may comprise reading data from a memory of the access control device, which caches data from a server of a site owner, owning the physical space.

The step of granting access may comprise reading data of assignments of permissions to site roles from a memory of the access control device, which caches data from a server of the site owner, owning the physical space.

The step of obtaining a set of site roles may comprise, for each site role, determining an organisational role, from a server of the organisation, associated with the credential and determining, from a server of the site owner, a site role associated with the organisational role.

According to a second aspect, it is presented an access control device for determining whether a user with a credential should be granted access to a physical space. The access control device comprises: a processor; and a memory storing instructions that, when executed by the processor, cause the access control device to: identify the credential presented to the access control device; and obtain a set of at least one assignment of a permission (P), associated with the physical space, to external organisations (O) from a database; determine a credential organisation being associated with the credential (C); grant access when, and only when, the permission is assigned to the credential organisation.

The instructions to obtain a set of site roles may comprise instructions that, when executed by the processor, cause the access control device to: obtain a set of site roles associated with the credential identity. In such a case, the instructions to grant access further comprise instructions that, when executed by the processor, cause the access control device to grant access when and only when there is at least one site role in the set of site roles to which a permission is assigned.

The instructions to obtain a set of site roles may comprise instructions that, when executed by the processor, cause the access control device to: obtain a user identity assigned to the credential; and obtain a set of site roles assigned to the user identity.

The instructions to grant access may further comprise instructions that, when executed by the processor, cause the access control device to grant access when and only when all available validity times of one or more of the assignments indicate validity.

The instructions to obtain a user identity assigned to the credential may comprise instructions that, when executed by the processor, cause the access control device to read data from a memory of the access control device, which caches data from a server of the credential organisation.

The instructions to obtain a set of site roles assigned to the user identity may comprise instructions that, when executed by the processor, cause the access control device to read data from a memory of the access control device, which caches data from a server of a site owner, owning the physical space.

The instructions to grant access comprise instructions that, when executed by the processor, cause the access control device to read data of assignments between site roles and permissions from a memory of the access control device, which caches data from a server of the site owner, owning the physical space.

The instructions to obtain a set of site roles may comprise instructions that, when executed by the processor, cause the access control device to, for each site role, determine an organisational role, from a server of the credential organisation, and determine a site role associated with the organisational role.

According to a third aspect, it is presented an access control system comprising a plurality of access control devices according to any one of claims the second aspect and a site management system server storing site role to user identity assignments and site role to permission assignments.

According to a fourth aspect, it is presented a computer program for determining whether a user with a credential should be granted access to a physical space. The computer program comprises computer program code which, when run on an access control device cause the access control device to: identify the credential presented to the access control device; and grant access when, and only when, the permission is assigned to an organisation controlling the assignment of the permission to the credential, wherein the organisation differs from a site owner controlling the access control device.

According to a fifth aspect, it is presented a computer program product comprising a computer program according to the fourth aspect and a computer readable means on which the computer program is stored.

Using the presented solution, the site owner delegates permissions to organisations rather than directly to users. By delegating permissions to an organisation, that organisation itself can manage the further delegation of permissions to the users of the organisation without involvement of the site owner. This greatly simplifies the task of the site owner and provides the required flexibility to the organisation. Moreover, each permission (corresponding to a restricted area) can be delegated to multiple organisations as needed.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
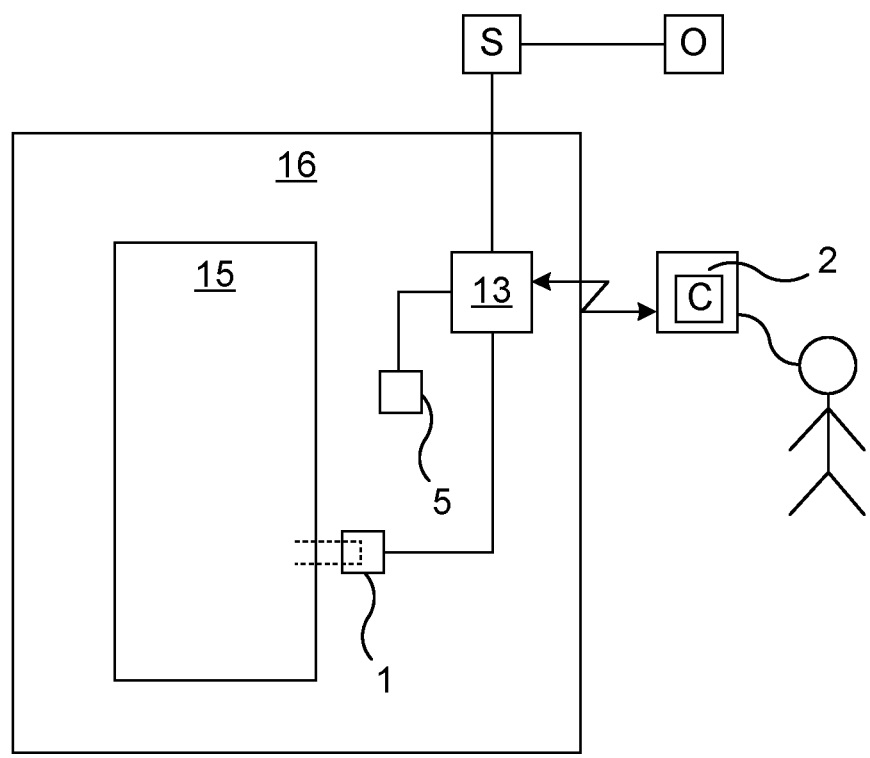
FIG. 1 is a schematic diagram showing an environment in which embodiments presented herein can be applied.

The invention will be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

First, terminology used herein is described.

A site is a well-defined physical space with restricted access to users. Typically, a site is a single building, a few nearby buildings, or a fenced outdoor area. The physical access to the site is controlled by an access control system.

A user is a human or a vehicle that can request physical access to a site.

An access control system is a system that restricts physical access to one or more sites.

Physical access control is the means by which physical access to a site is restricted to certain users.

A site owner is an entity that owns a site or is delegated the right to administer the site on behalf of the actual owner.

A permission is the approval of physical access to a particular restricted area at a site through one or multiple barriers. The approval can have time constraints. For example, access to a restricted area can be limited to certain hours during a week, or to a certain time period between two dates.

A barrier is a door, gate, window or other physical means by which access to a physical space of a site can be restricted so that only users with permission to do so is allowed access. A barrier may also restrict the exit from an area.

An organisation is any type of entity that can have users, including, but not limited to: a business entity, a government agency, a non-profit organisation, a university, a political association, a family, etc.

An organisation management system is an information system that handles users, credentials, organisation roles, and related information for an organisation.

A site management system is an information system with associated hardware (electronic locks, barriers, et cetera) that enforces physical access control to a particular site.

A credential is something used to authenticate a user. Examples include, but is not limited to: a proximity card, a magnetic stripe card, a mobile phone, the properties of a human face of (for face recognition), a username plus password combination, a pin code, an electronic security token, a USB thumb drive. A credential may be data derived from the original credential; for example, a secure hash of a password.

A time constraint is a constraint in time that limits the validity of an entity or the validity of a relationship between entities to certain times. An entity is any object, real or part of the model, described herein, such as organisation, site owner, credential, etc. Mathematically, a time constraint is a boolean-valued function of time. The function value is either true (valid) or false (invalid) for any particular time value.

A communication channel between two entities is any means that provides the transport of digital messages between said two entities.

In here, the following notation is used, optionally with numerical suffices to indicate different instances of the same type.
- S—site
- SMS—site management system
- O—organisation
- OMS—organisation management system
- C—credential
- U—user
- P—permission
- TC—time constraint
- OR—organisation role
- SR—site role
- OA—organisation administrator
- SA—site administrator FIG. 1 is a schematic diagram showing an environment in which embodiments presented herein can be applied.

Access to a physical space 16 is restricted by a physical barrier 15 which is selectively unlockable. For instance, the barrier 15 can be a door, gate, hatch, window, etc. In order to unlock the barrier 15, an access control device 13 is provided. The access control device 13 is connected to (or is integrated with) a physical lock device 1, which is thus controllable by the access control device 13 to be set in an unlocked state or locked state.

The access control device 13 can on occasion obtain access to a credential C of a user U. For instance, the credential can be implemented using a portable key device 2 with which the access control device communicates over a wireless interface using one or more antennas 5 (provided externally from the access control device 13 or internally). The portable key device 2 is any suitable device portable by a user (U), comprising a credential (C) which can be used for authentication over the wireless interface. The portable key device 2 is typically carried or worn by the user and may be implemented as a mobile phone, a smartphone, a key fob, wearable device, smart phone case, RFID (Radio Frequency Identification) card, etc. As explained in more detail below, the authenticity and authority of the portable key device is checked by the access control device 13, resulting in the access control device 13 granting or denying access. Alternatively or additionally, the credential C is a form of biometric, e.g. by means of characteristics of a user's human face, finger or retina. Alternatively or additionally, the credential can be provided using a user interface, e.g. a username and password combination, a pin code, or via a wired connection e.g. to a USB (Universal Serial Bus) solid state memory drive. A credential can also be read using data derived from the original credential; for example, a secure hash of a password.

When access is granted, the access control device 13 sends an unlock signal to the lock device 1, whereby the lock device 1 is set in an unlocked state. In this embodiment, this can e.g. imply a signal over a wire-based communication, e.g. using a serial interface (e.g. RS485, RS232), USB, Ethernet, or even a simple electric connection (e.g. to the lock device 1), or alternatively over a wireless interface.

When the lock device 1 is in an unlocked state, the barrier 15 can be opened and when the lock device 1 is in a locked state, the barrier 15 cannot be opened. In this way, access to a physical space 16 is controlled by the access control device 13. Optionally, a door opener is also activated when the lock device 1 is set in an unlocked state, thereby opening the barrier 15. It is to be noted that the access control device 13 and/or the lock device 1 can be mounted in a fixed structure (e.g. wall, frame, etc.) by the physical barrier 15 (as shown) or in the physical barrier 15 (not shown).

The access control device 13 is connected to a site management system SMS of the site owner, which in turn is connected to an organisation management system OMS of the organisation to which the user U is associated.

Now, the many-to-many relation between sites and organisations will be explained, initially with reference to FIG. 2.

An organisation often uses multiple sites for its operations. A site, in turn, is often used by multiple organisations. Thus, there is a many-to-many relation between sites and organisations. Prior art access control systems do not model this relationship in an explicit and practical way as proposed by embodiments presented herein.

Figure 2:
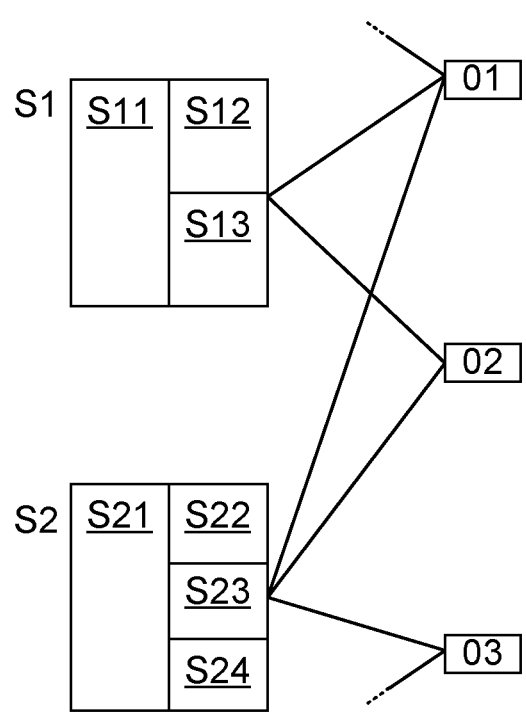
FIG. 2 is a schematic diagram showing two sites with restricted areas and site management systems, for use by three organisations.

FIG. 2 shows an example of a many-to-many relation between sites and organisations. Site S1 is used by organisations O1, and O2, and comprises three restricted areas S11, S12 and S13. Restricted area S12 is accessed by O1 only. Restricted area S13 is accessed by O2 only. Restricted area S11 is accessed by both O1 and O2.

Site S2 is used by organisations O1, O2, and O3 comprises four restricted areas S21, S22, S23 and S24. Restricted areas S22 and S23 are accessed by O2, only. Restricted area S24 is accessed by O3 only. Restricted area S21 is accessed by all of O1, O2, and O3.

In addition, organisations O1 and O3 may use sites not included in FIG. 2 as is indicated with dotted lines.

Real-world scenarios can be much more complicated. In general, there is no natural way to define a boundary of an access control system that should manage a given set of sites and organisations. The sites and organisations will, in general, have relationships with other sites and organisations that inevitably will cross any chosen system boundary.

Instead of forcing a boundary around a set of sites and organisations, embodiments presented herein suggest that the real-world many-to-many relationship is included in model of the access control systems. Thus, there is no boundary to the access control system presented here. The overall solution is instead a network of organisation management systems (OMS) and site management systems (SMS) connected via communication channels. Sites can dynamically add and remove links to organisation management systems without disturbing the ongoing operation of the network.

For instance, sites management systems (SMS) and organisation management systems (OMS) can be connected via encrypted communication channels over the public Internet, for example using TLS (Transport Layer Security) sockets over TCP (Transport Control Protocol). However, the site management systems and identity management systems may be connected through a private network or via any other suitable type of communication channels.

Using embodiments presented herein, the organisations O are delegated the task of providing access to individuals. Still, the site owner S can at any time revoke all access to sites for an organisation O, e.g. if the organisation is a tenant that moves out or refuses to pay the rent. By splitting the responsibility, the overall relationship between access to an area and organisation is controlled by the site owners S while the day to day management of users, roles and credentials is handled by the organisations O. The embodiments can thus be used for commercial site owners. Additionally, the embodiments can be used for private homes, where the site owner S is a private owner which delegates the permission P to an external organisation O, such as tradesmen, cleaners, neighbours (e.g. if the site owner is away), etc.

There is typically a one-to-one relation between organisations and their organisation management systems. Likewise, there is typically a one-to-one relation between sites and site management systems.

The access control model of embodiments presented herein is based on role-based access control (RBAC), which is used in many other systems. In this way, roles, user identities and credential identities can be exchanged with other systems.

For RBAC, the following relationships hold:

$$C*\text{---}TC\text{---}1\ U \quad (1)$$

$$U\ *\text{---}TC\text{---}*\ OR \quad (2)$$

$$OR\ *\text{---}TC\text{---}1\ P \quad (3)$$

Here, "*---*" denotes a many-to-many relation between entities, while "1---*" denotes a one-to-many relation, in the indicated direction. Hence, each credential, C, is assigned to exactly one user, U. A user U can have multiple credentials C. A credential C (or equivalently, the association of a credential C to a user U) may have a time constraint, TC. A time constraint of a credential can be a validity time period with a start date and an expiration date. For instance, a first time constraint TC1 for role office workers can be defined as 7 a.m. to 6 p.m. on Monday to Friday, while a second time constraint TC2 for security personnel can be defined as 24 hours a day 7 days a week.

A user, U, is assigned to zero or more organisation roles, OR (e.g. office workers, security personnel). Also, permissions, P, are assigned to each organisation role, OR. These assignments may have time constraints, TC. In the text that follows, the phrase "is assigned to . . at time t" means that the assignment exists, and the time constraint should not invalidate the assignment at time t.

In this model, when a user requests permission P to enter a barrier at a particular time, t, by using his credential C, access through the barrier is authorised if and only if there exists an organisation role, OR, such that the following conditions hold.

1. C is assigned to a user U at time t.
3. U has role OR at time t.
3. P is assigned to OR at time t.

This is essentially RBAC with time-constraints applied to physical access control and users that can have multiple credentials. This model is flexible enough to be the basis for an access control system that handles a single site and a single organisation. The model does not, however, include the notion of organisations, the delegation of permissions from a site owner to organisations, and it does not handle the real-world many-to-many relation between sites and organisations. Below, it is described how RBAC is extended and how the many-to-many relation between sites and organisations is incorporated in the presented embodiments.

Figure 3:
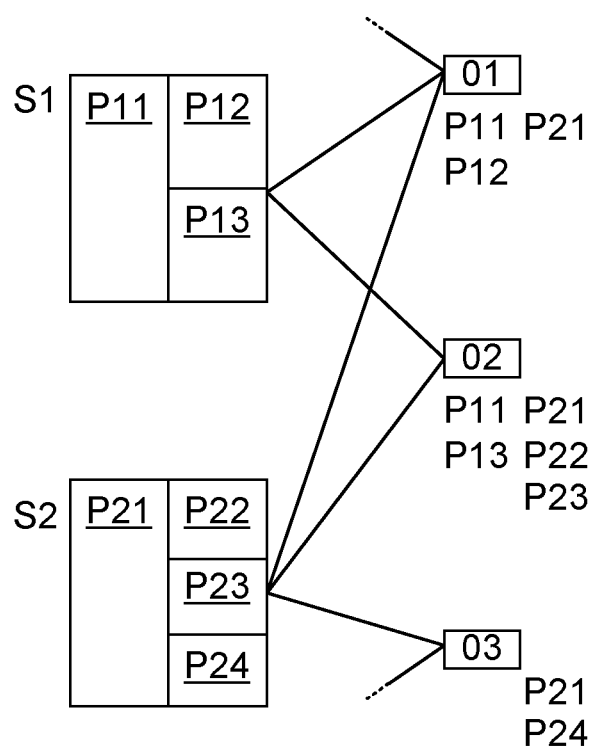
FIG. 3 is a schematic diagram showing two sites with restricted areas and how permissions to enter the restricted areas are delegated to the organisations.

FIG. 3 is a schematic diagram showing two sites with restricted areas and how permissions to enter the restricted areas are delegated to the organisations. One aspect presented herein is a delegation of site permissions from the site owner to organisations which in turn can manage those delegated permissions by further delegating them to users (via organisation roles).

In FIG. 3, each restricted area is given a specific permission, in correspondence with what is shown in FIG. 2. For example, permission P11 is the permission to enter the left-most restricted area of S1; the one that is shared between organisations O1 and O2. In the example, there is a one-to-one relation between restricted areas and permissions. This may not always be the case, but is used here to avoid unnecessary complexity. FIG. 3 shows that permissions P11, P12, and P21 have been delegated to O1, permissions P11, P13, P21, P22, and P23 have been delegated to O2; and permissions P21 and P24 have been delegated to O3.

Figure 4:
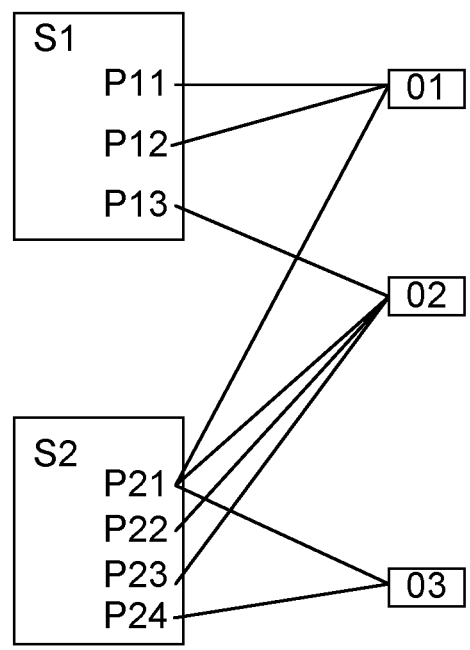
FIG. 4 is a schematic diagram showing two sites, their permissions, and how the permissions are delegated to the organisations.

FIG. 4 shows the same permission delegation example as in FIG. 3. However, FIG. 4 does not show the restricted areas of the sites; instead it shows the explicit delegation of each permission to one or multiple organisations. For example, permission P11 (to enter the common area of site S1) is delegated to O1 and O2; while permission P12 is delegated to O1 only. Permission P13 is only delegated to O2. Permission P21 (the common area of site S2) is delegated to all three organisations: O1, O2, and O3. Permissions P22 and P23 are delegated to only O2, and permission P24 is delegated only to O3.

The delegation of site permissions to organisations is handled by a site administrator SA in the site management system SMS of each site S1, S2. When a new organisation is to start using a part of a site, the SA adds a connection to the organisation management system OMS of the organisation. When this is done, digital communication can be made between O and S. But, SA also needs to delegate a set of site permissions to O before the organisation can start using the part of the site it should have access to.

Once a new connection between a site, S, and an organisation, O, has been made and the SA has delegated a set of permissions to the organisation O, the organisation administrator OA creates site roles SR in the site management system. A site role can be seen as the implementation of an organisation role in a specific site management system. An organisation role, OR, in an organisation management system is an object with an identifier and a description. The OR has no affect until it is implemented in at least one site management system. For instance, access to the site management system SMS for one or more organisations O can be provided using a web interface.

An SR is created by the OA of the organisation in the site administration system. The SR is created by assigning a set of permissions to it, optionally with time constraints. The permissions in a SR must have been delegated to the organisation before they are assigned to a SR.

The organisation administrator OA is also responsible for assigning access to the individual users of the organisation. In this example, the OA assigns organisation roles to users and permissions to organisation roles. Hence, instead of assigning individual permissions directly to users, permissions are assigned to roles and roles are assigned to users.

Figure 5:
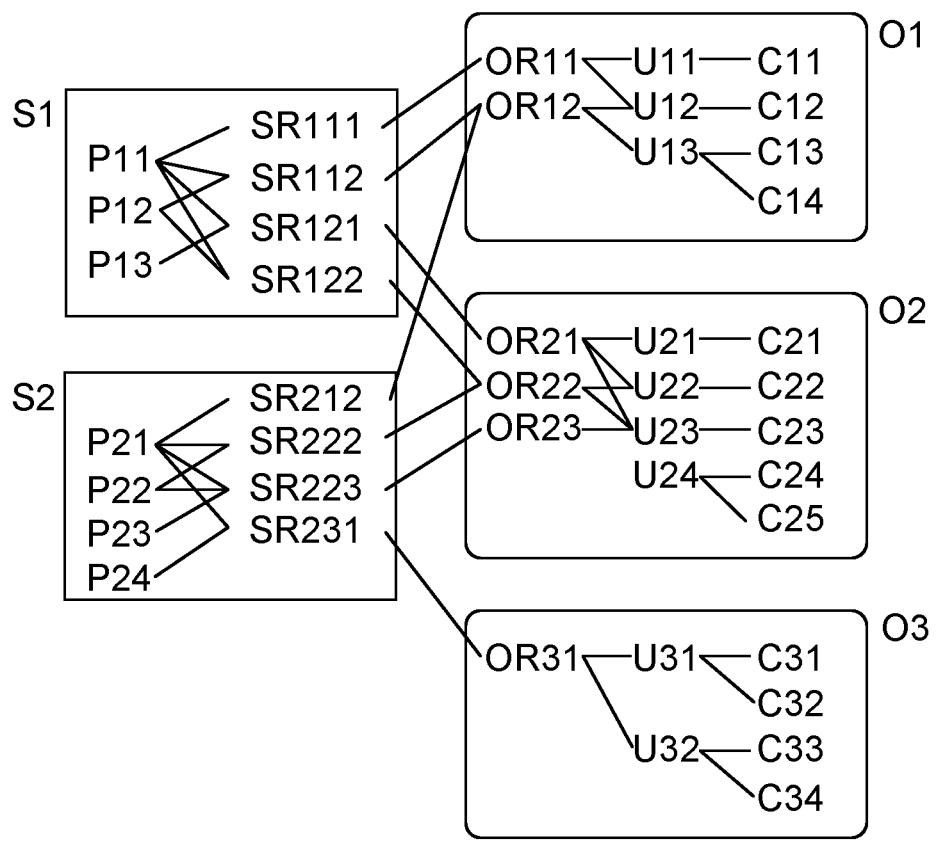
FIG. 5 is a schematic diagram showing an example of two sites and how the permissions are associated with site roles.

FIG. 5 shows an example of how access to sites S1 and S2 is shared between the users of organisations O1, O2, and O3. The example is an extension to the example as shown in FIGS. 2, 3, and 4. Let us first look at organisation O1 of the example in FIG. 5. The owner of site S1 (via the SA of the site) has delegated P11 and P12 to O1. The owner of site S2 has delegated P21 to O1. The OA of O1 has created the organisations roles, OR11 and OR12; and their implementations in S1 and S2. The implementation of OR11 in S1 is denoted SR11 and it contains one permission, P11. The implementation of OR12 in S1 is denoted SR112 and it contains two permissions: P11 and P12. The implementation of OR12 in S2 is denoted SR212, and is implemented in a separate site administration system. This SR contains one permission, P21. O1 further assigns credentials C11-C14 to users U11-U13 as shown and the users U11-U13 to the roles OR11-OR12.

Organisation O2, creates three roles O21, OR22, OR23 and their implementations SR121, SR122 in S1 and SR222 and SR223 in S2. O2 further assigns credentials C21-C25 to users U21-U24 as shown and the users U21-U24 to the roles OR21-OR23.

Organisation O3 creates one role O31 and its implementation SR231 in S2. O2, further assigns credentials C31-C34 to users U31-U32 as shown and the users U31-U32 to the role OR231.

From FIG. 5, we can, for example, see that user U11 has access to P11, but not to P12 nor to P21. User U12 has access to P11, P12, and P21. User U13 has access to P11, P12, and P21.

Having now described a detailed example above, the concepts used will now be described in a more general way.

There are essentially two different types of human actors who administer the proposed access control system: the site administrator (SA), and the organisation administrator (OA).

The site administrator works on behalf of the site owner and has the following tasks:
 In SMS, adds/removes connections to OMS.
 In SMS, assigns (delegates): P--->O.
 In SMS, sets up the site management system with settings, defines permissions etc.

The organisation administrator works on behalf of the organisation and has the following tasks:
 In OMS, creates/deletes U.
 In OMS, creates/deletes OR.
 In OMS, assigns: C--(TC)-->U.
 In OMS, assigns: U--(TC)-->OR.
 In SMS, assigns: P--(TC)-->SR, for a permission P which is delegated to O.

The access control device is the logical entity that takes the decision of granting a user access to a restricted area or not depending on the credential shown, the current time, and the current state of the access control system.

A user requests permission P to enter a barrier at a site, S, by showing his credential, C, at time t to the access control device. The user is authorised to enter the barrier if and only if there exists at least one organisation role, OR, such that all of the following conditions hold:
 1. C is assigned to a user U, at time t,
 2. U is assigned to role OR at time t,
 3. there is a site role SR of site S associated with OR,
 4. P is assigned to SR at time t,
 5. P is delegated to O at time t.

It is to be noted that one permission can be assigned to only one barrier or one permission can be assigned to a plurality of barriers. This is decided by the site owner. Optionally, the user stage is omitted, when Cs are directly assigned to roles OR.

Figure 6:
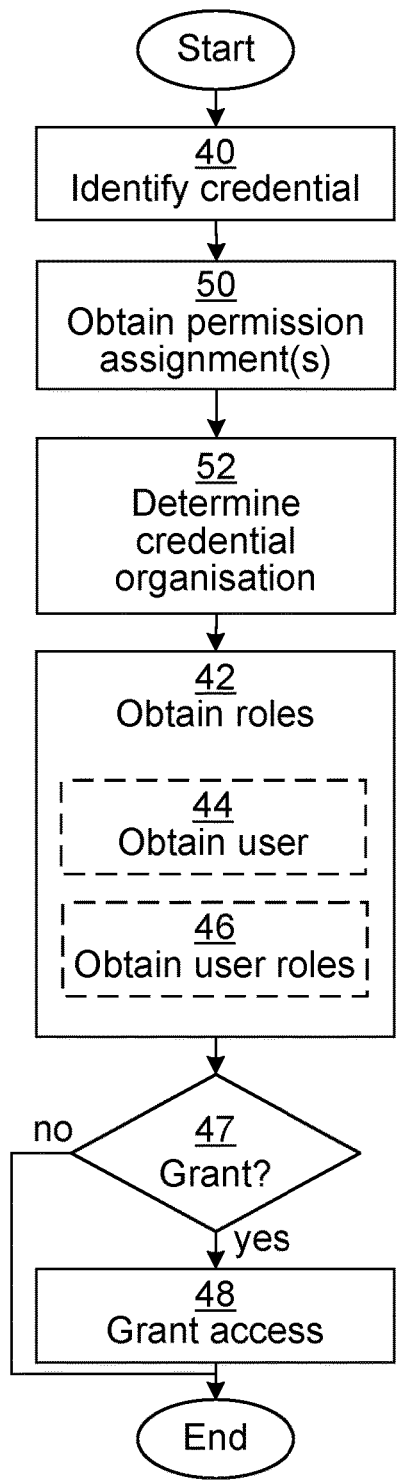
FIG. 6 is a flow chart illustrating an embodiment of a method performed in the access control device of FIG. 1 for determining whether a user with a credential should be granted access to a physical space.

FIG. 6 is a flow chart illustrating a method for determining whether a user with a credential C should be granted access to a physical space. The method is performed in an access control device, such as the access control device 13 of FIG. 1.

In an identify credential step 40, the credential C presented to the access control device is identified. As explained above, the credential C can be from a portable key device, using biometrics, or user interface interaction.

In an obtain permission assignment(s) step 50, a set of at least one assignment of a permission P to external organisations O are obtained from a database. The permission is associated with the physical space. Since the set can contain more than one assignment, this allows multiple external organisations to be associated with the physical space, as explained above.

In a determine credential organisation step 52, a credential organisation being associated with the credential C is determined. In one embodiment, the credential organisation is obtained by reading the credential organisation from the credential itself. Alternatively, the credential organisation can be obtained by querying a database using an identifier (e.g. credential identifier or user identifier) obtained from the credential. Optionally, a nomenclature of the identifier from the credential is used to identify the credential organisation, e.g. using a subset (e.g. the first/last n characters) of the identifier from the credential.

In an optional obtain roles step 42, a set of roles SR associated with the credential identity is obtained. The set can contain zero, one or more roles. In one embodiment, there is a direct link between the credential identity and role(s). In another embodiment, the credential is assigned to a user and the user, in turn, is assigned role(s), in which case an obtain user step 44 and an obtain user roles step 46 is performed as part of the obtain roles step 42. The roles can e.g. be office worker, janitor, security personnel, sub-contractor, etc.

Optionally, the obtain roles step 42 comprises, for each site role SR, determining an organisational role OR, from a server (of the organisation management system) of the credential organisation. Once the organisational role OR is found, this step comprises determining, from a server (of the site management system) of the site owner, a site role SR associated with the organisational role OR.

In the obtain user step 44, a user identity assigned to the credential C is obtained. This data can be read from a memory of the access control device, which caches the data from a server (of the organisation management system) of the credential organisation O. Alternatively, this data is obtained from the OMS.

In the obtain user roles step 46, a set of roles SR assigned to the user U identity is obtained. This data can be read from a memory of the access control device, which caches data from a server (of the site management system) of a site owner S, owning the physical space. Alternatively, this data is obtained directly from the server of the SMS.

In a conditional valid step 47, it is determined whether access should be granted. This is true when, and only when, permission P is assigned to the credential organisation. The credential organisation controls the assignment of permission P to credentials C. The assignment by the organisation of permissions to credentials can be direct, or via roles and/or users as described above. It is to be noted that the (credential) organisation O differs from a site owner S controlling the access control device. Optionally, validity times are also applied in this step such that the access is only granted when also all available validity times of one or more of the assignments indicate validity. Such validity times can be applied to any one or more of: the assignment between credential and user, the assignment between user and role, the assignment between permission and role and the assignment between permission and organisation.

This step can comprise reading data of assignments between site roles and permissions from a memory of the access control device, which caches data from a server of the site owner S, owning the physical space.

In a grant access step 48, access is granted to the physical space and a lock device connected to the access control device is set in an unlocked state.

Through the structure and delegation of responsibilities presented herein, many issues such as: data synchronisation issues, multiple places to administer user-to-role assignments, the need for import/export of credentials, can be reduced or completely avoided. Moreover, the site owner installs the access control devices of the SMS, relieving this task from the organisations, and also giving the site owners full control of access using each permission for various organisations.

Figure 7:
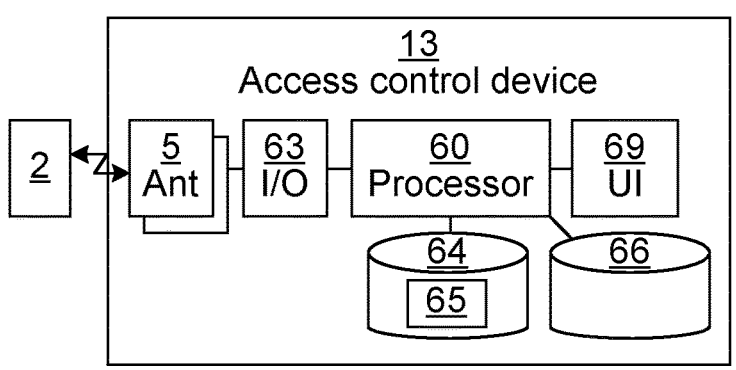
FIG. 7 is a schematic diagram illustrating an embodiment of the access control device of FIG. 1.

FIG. 7 is a schematic diagram illustrating an embodiment of the access control device 13 of FIG. 1.

A processor 60 controls the general operation of access control device 13. The processor 60 can be any combination of one or more of a suitable central processing unit (CPU), multiprocessor, microcontroller unit (MCU), digital signal processor (DSP), application specific integrated circuit (ASIC) etc., capable of executing software instructions or otherwise configured to behave according to predetermined logic. Hence, the processor 60 can be capable of executing software instructions 65 stored in a memory 64, which can thus be a computer program product. The processor 60 can be configured to execute the method described with reference to FIG. 6 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60, for caching relationships between credentials and users, users and roles, users and organisations, permissions and roles, and permissions and organisations. The data memory 66 can be any combination of read and write memory (RAM) and read only memory (ROM).

The access control device 13 further comprises an I/O interface 63 for communicating with other external entities such as the lock device 1, the portable key device 2, and the site management system SMS. The I/O interface 63 comprises a communication interface, e.g. Ethernet or wireless LAN (Local Area Network) for communication with the site management system. The I/O interface 63 communicates with the portable key device 2 over a wireless interface using one or more antennas 5. The I/O interface 63 can support such wireless communication over any suitable wireless interface, e.g. using Bluetooth, Bluetooth Low Energy (BLE), any of the IEEE 802.15 standards, Radio Frequency Identification (RFID), Near Field Communication (NFC), any of the IEEE 802.11 standards, wireless USB, etc.

Optionally, the access control device 13 also includes a user interface 69, e.g. comprising any one or more of a light emitting diodes (LED) or other lights, a display, keys or keypad, etc.

Optionally, the access control device 13 is combined with the lock device 1 in a single device. In such a case, one or more of the components of the access control device 13 can be shared with the lock device 1.

Figure 8:
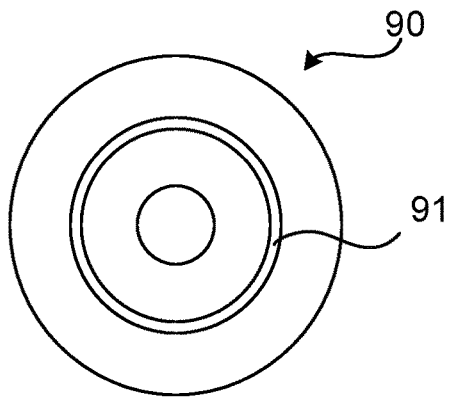
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

Figure 9:
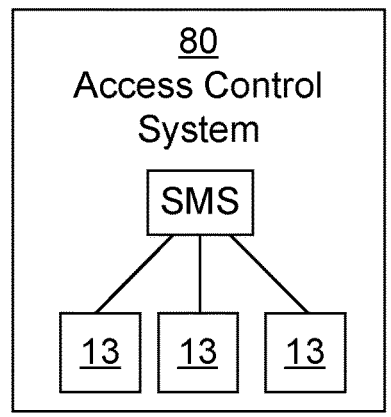
FIG. 9 is a schematic diagram illustrating an access control system.

FIG. 9 is a schematic diagram illustrating an access control system 80. The access control system 80 comprises a plurality of access control devices 13, e.g. of FIG. 1. Moreover, the access control system comprises a site management system SMS server storing site role to user identity assignments and site role to permission assignments.

Here now follows a set of embodiments enumerated with roman numerals.

i. A method for determining whether a user with a credential should be granted access to a physical space, the method being performed in an access control device and comprising the steps of:
  identifying the credential presented to the access control device; and
  granting access when, and only when, the permission is assigned to an organisation controlling the assignment of the permission to the credential, wherein the organisation differs from a site owner controlling the access control device.

ii. The method according to embodiment i, further comprising the step of:
  obtaining a set of site roles associated with the credential identity;
  wherein the step of granting access further comprising granting access when and only when there is at least one site role in the set of site roles to which a permission is assigned.

iii. The method according to embodiment ii, wherein the step of obtaining a set of site roles comprises the steps of:
  obtaining a user identity assigned to the credential; and
  obtaining a set of site roles assigned to the user identity.

iv. The method according to any one of the preceding embodiments, wherein the step of granting access further comprises granting access when and only when all available validity times of one or more of the assignments indicate validity.

v. The method according to embodiment iii or iv, wherein the step of obtaining a user identity assigned to the credential comprises reading data from a memory of the access control device, which caches data from a server controlled by the organisation.

vi. The method according to any one of embodiments iii to v, wherein the step of obtaining a set of site roles assigned to the user identity comprises reading data from a memory of the access control device, which caches data from a server controlled by a site owner, owning the physical space.

vii. The method according to any one of the preceding embodiments, wherein the step of granting access comprises reading data of assignments between site roles and permissions from a memory of the access control device, which caches data from a server controlled by the site owner, owning the physical space.

viii. The method according to any one of the preceding embodiments, wherein the step of obtaining a set of site roles comprises, for each site role, determining an organisational role, from a server controlled by the organisation, associated with the credential and determining, from a server controlled by the site owner, a site role associated with the organisational role.

ix. An access control device for determining whether a user with a credential should be granted access to a physical space, the access control device comprising:
a processor; and
a memory storing instructions that, when executed by the processor, cause the access control device to:
identify the credential presented to the access control device; and
grant access when, and only when, the permission is assigned to an organisation controlling the assignment of the permission to the credential, wherein the organisation differs from a site owner controlling the access control device.

x. The access control device to embodiment ix, wherein the instructions to obtain a set of site roles comprise instructions that, when executed by the processor, cause the access control device to:
obtain a set of site roles associated with the credential identity;
and wherein the instructions to grant access further comprise instruction that, when executed by the processor, cause the access control device to grant access when and only when there is at least one site role in the set of site roles to which a permission is assigned.

xi. The access control device to embodiment x, wherein the instructions to obtain a set of site roles comprise instructions that, when executed by the processor, cause the access control device to:
obtain a user identity assigned to the credential; and
obtain a set of site roles assigned to the user identity.

xii. The access control device according to any one of embodiments ix to xi, wherein the instructions to grant access further comprise instructions that, when executed by the processor, cause the access control device to grant access when and only when all available validity times of one or more of the assignments indicate validity.

xiii. The access control device according to embodiment xi to xii, wherein the instructions to obtain a user identity assigned to the credential comprise instructions that, when executed by the processor, cause the access control device to read data from a memory of the access control device, which caches data from a server controlled by the organisation.

xiv. A computer program for determining whether a user with a credential should be granted access to a physical space, the computer program comprising computer program code which, when run on an access control device cause the access control device to:
identify the credential presented to the access control device; and
grant access when, and only when, the permission is assigned to an organisation controlling the assignment of the permission to the credential, wherein the organisation differs from a site owner controlling the access control device.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining whether a user with a credential having permissions assigned to and controlled by a credential organization should be granted access to a physical space, the method being performed in a physical lock device which can be set in an unlocked state or locked state that is controlled by a site owner and comprising the steps of:
identifying the credential presented to the physical lock device;
obtaining, from a database and based on the identification of the credential presented to the physical lock device, a set of at least one assignment of a permission, associated with the physical space, to a plurality of external organizations, wherein the plurality of external organizations comprise the credential organization and wherein the credential organization is different from the site owner;
determining, based on obtaining from the database the set of at least one assignment of the permission, that the credential organization is associated with the credential and that the credential organization is assigned the permission; and
granting access, by the physical lock device and in accordance with a rule defined by the site owner, when, and only when, the permission is determined to be assigned to the credential organization based on obtaining the set of at least one assignment of the permission from the database.

2. The method according to claim 1, further comprising the step of: obtaining a set of site roles associated with the credential identity;
wherein the step of granting access further comprising granting access when and only when there is at least one site role in the set of site roles to which a permission is assigned.

3. The method according to claim 2, wherein the step of obtaining a set of site roles comprises the steps of:
obtaining a user identity assigned to the credential; and
obtaining a set of site roles assigned to the user identity.

4. The method according to claim 1, wherein the step of granting access further comprises granting access when and only when all available validity times of one or more of the assignments indicate validity.

5. The method according to claim 3, further comprising the step of: caching data from a server of the credential organization in a memory of the physical lock device;
and wherein the step of obtaining a user identity assigned to the credential comprises reading data from the memory of the physical lock device.

6. The method according to claim 3, further comprising the step of:
caching data from a server of a site owner, owning the physical space, in a memory of the physical lock device;
and wherein the step of obtaining a set of site roles assigned to the user identity comprises reading data from the memory of the physical lock device.

7. The method according to claim 1, further comprising the step of:
caching data from a server of the site owner, owning the physical space, in a memory of the physical lock device;
and wherein the step of granting access comprises reading data of assignments of permissions to site roles from the memory of the physical lock device.

8. The method according to claim 1, wherein the step of obtaining a set of site roles comprises, for each site role, determining an organizational role, from a server of the credential organization, and determining, from a server of the site owner, a site role associated with the organizational role.

9. A physical lock device that is switchable between an unlocked state and a locked state for determining whether a user with a credential having permissions assigned to and controlled by a credential organization should be granted access to a physical space of a site owner, the physical lock device comprising:
 a processor; and
 a memory storing instructions that, when executed by the processor, cause the physical lock device to:
  identify the credential presented to the physical lock device;
  obtain, from a database and based on the identification of the credential presented to the physical lock device, a set of at least one assignment of a permission, associated with the physical space, to a plurality of external organizations, wherein the plurality of external organizations comprise the credential organization and wherein the credential organization is different from the site owner;
  determine, based on obtaining from the database the set of at least one assignment of the permission, that the credential organization is associated with the credential and that the credential organization is assigned the permission; and
  grant access in accordance with a rule defined by the site owner when, and only when, the permission is determined to be assigned to the credential organization based on obtaining the set of at least one assignment of the permission from the database.

10. The physical lock device according to claim 9, wherein the instructions to obtain a set of site roles comprise instructions that, when executed by the processor, cause the physical lock device to:
 obtain a set of site roles associated with the credential identity;
 and wherein the instructions to grant access further comprise instructions that, when executed by the processor, cause the physical lock device to grant access when and only when there is at least one site role in the set of site roles to which a permission is assigned.

11. The physical lock device according to claim 10, wherein the instructions to obtain a set of site roles comprise instructions that, when executed by the processor, cause the physical lock device to:
 obtain a user identity assigned to the credential; and
 obtain a set of site roles assigned to the user identity.

12. The physical lock device according to claim 9, wherein the instructions to grant access further comprise instructions that, when executed by the processor, cause the physical lock device to grant access when and only when all available validity times of one or more of the assignments indicate validity.

13. The physical lock device according to claim 11, wherein the instructions to obtain a user identity assigned to the credential comprise instructions that, when executed by the processor, cause the physical lock device to read data from a memory of the physical lock device, which caches data from a server of the credential organization.

14. The physical lock device according to claim 11, wherein the instructions to obtain a set of site roles assigned to the user identity comprise instructions that, when executed by the processor, cause the physical lock device to read data from a memory of the physical lock device, which caches data from a server of a site owner, owning the physical space.

15. The physical lock device according to claim 9, wherein the instructions to grant access comprise instructions that, when executed by the processor, cause the physical lock device to read data of assignments of permissions to site roles from a memory of the physical lock device, which caches data from a server of the site owner, owning the physical space.

16. The physical lock device according to claim 9, wherein the instructions to obtain a set of site roles comprise instructions that, when executed by the processor, cause the physical lock device to, for each site role, determine an organizational role, from a server of the credential organization and determine, from a server of the site owner, a site role associated with the organizational role.

17. An access control system comprising a plurality of physical lock devices according to claim 9 and a site management system server storing site role to user identity assignments and site role to permission assignments.

18. A non-transitory computer-readable means comprising a computer program stored thereon for determining whether a user with a credential having permissions assigned to and controlled by a credential organization should be granted access to a physical space of a site owner, the computer program comprising computer program code which, when run on a physical lock device which can be set in an unlocked state or locked state, cause the physical lock device to:
 identify the credential presented to the physical lock device;
 obtain, from a database and based on the identification of the credential presented to the physical lock device, a set of at least one assignment of a permission, associated with the physical space, to a plurality of external organizations, wherein the plurality of external organizations comprise the credential organization and wherein the credential organization is different from the site owner;
 determine, based on obtaining from the database the set of at least one assignment of the permission, that the credential organization is associated with the credential and that the credential organization is assigned the permission; and
 grant access in accordance with a rule defined by the site owner when, and only when, the permission is determined to be assigned to the credential organization based on obtaining the set of at least one assignment of the permission from the database.

19. A computer program product comprising a computer program according to claim 18 and the non-transitory computer-readable means on which the computer program is stored.

* * * * *